United States Patent [19]

Brosse

[11] Patent Number: 5,299,451
[45] Date of Patent: Apr. 5, 1994

[54] FIRST CYLINDER DETECTOR FOR A GASOLINE INTERNAL COMBUSTION ENGINE

[75] Inventor: Gérard Brosse, Creteil, France

[73] Assignee: Sagem Allumage, Paris, France

[21] Appl. No.: 876,025

[22] Filed: Apr. 30, 1992

[30] Foreign Application Priority Data

Apr. 30, 1991 [FR] France .................. 91 05310

[51] Int. Cl.⁵ .......................................... G01M 15/00
[52] U.S. Cl. ..................................... 73/116; 324/207.2
[58] Field of Search ............... 73/117.3, 116; 307/278; 123/414; 324/207.2

[56] References Cited

U.S. PATENT DOCUMENTS 3,473,109 10/1969 Maaz et al. ................ 324/207.2

FOREIGN PATENT DOCUMENTS 2647818 4/1978 Fed. Rep. of Germany ... 324/207.2

Primary Examiner—Jerry W. Myracle
Attorney, Agent, or Firm—Dennison, Meserole, Pollack & Scheiner

[57] ABSTRACT

The detector includes a unipolar Hall effect pickup (3) for detecting the passage of a target (14) of soft magnetic material that is movable in displacement with the piston of the first cylinder and is intended to loop the field lines of a permanent magnet (4) to the sensitive zone of the pickup (3). The detector includes two magnets (4, 5) arranged to cancel the resting magnetic induction in the sensitive zone of the pickup (3).

6 Claims, 2 Drawing Sheets

FIRST CYLINDER DETECTOR FOR A GASOLINE INTERNAL COMBUSTION ENGINE

FIELD OF THE INVENTION

The present invention relates to a detector for generating a signal indicative of the first cylinder piston of a gasoline internal combustion engine being at top dead center (TDC).

BACKGROUND OF THE INVENTION

The purpose of such a detector is to suitably sequence the injection of gasoline into the cylinders of the engine by initializing the injection into a predetermined cylinder, called the number one or first cylinder.

A first cylinder detector is indispensable both in engines with dynamic computerized ignition and in engines with static ignition, also by computer, or, in other words, in all engines with ignition by computer, which for its injection function must be initialized.

The present invention particularly relates to a first cylinder detector including a unipolar Hall-effect pickup, associated with a permanent magnet and arranged to detect the passage of a target of soft magnetic material, i.e., the material without a permanent magnetization zone, which upon passage past the pickup and the permanent magnet, loops the field lines of the magnet and the pickup. A target, such as a boss, is formed on a pulley which is fixed to the camshaft of the engine so as to correspond to top dead center (TDC) of the first cylinder piston.

Upon the passage of the target past the detector, the sensitive zone of the Hall effect pickup is thus subjected to a variation in magnetic flux that is to be detected.

In fact, this magnetic flux variation cannot be detected if it is inadequate in proportion to a permanent leakage flux between the pickup and the permanent magnet.

In other words, unless the magnet is to be shifted exaggeratedly relative to the pickup, the magnetic induction in the absence of the target may be too high for a change in the state of the Hall circuit upon passage of the target to be detectable.

Again, in other words, this kind of first cylinder detector is reliable only for very small air gaps between the target and the pickup of less than approximately 0.2 mm.

To increase this air gap size, it has already been proposed that the pickup be doubled, so that two such pickups are associated with one permanent magnet. The output signal of the pickup closest to the path of the target is modulated, while the output signal of the other is not, and by addition of the output signals, a target passage with an air gap that may reach approximately 1 mm is detectable. However, this is a tedious provision because it requires two pickups of the same sensitivity, which is especially difficult to achieve.

The present invention seeks to propose a solution to this problem.

OBJECT AND SUMMARY OF THE INVENTION

It is the object of the present invention to disclose a first cylinder detector for a gasoline internal combustion engine which includes a single unipolar Hall effect pickup arranged to detect the passage of a target of soft magnetic material that is movable in relation to displacement with the piston of said first cylinder and is intended to loop the lines of flux of a permanent magnet to the sensitive zone of the pickup, wherein the detector includes means arranged to cancel the resting magnetic induction in the sensitive zone of the pickup.

Thanks to the invention, regardless of the size of the air gap between the pickup and the target, since in the absence of the target the resting induction to which the pickup is exposed is virtually zero, the pickup can detect the variation in flux, however slight it may be, brought about by the passage of the target.

In the preferred embodiment of the detector of the invention, two permanent magnets are provided, producing fields of the same amplitude and of opposite polarities, and disposed symmetrically with respect to the sensitive zone of the pickup.

Since, unlike two identical pickups, two quasi-identical magnets are easy to make, the fields of the same value of the two magnets of the detector of the invention oppose one another in order to cancel the induction in the sensitive zone of the pickup.

In that case, the pickup and the two magnets are advantageously disposed so that only the pickups and the one of the two magnets whose magnetic field then becomes predominant and sufficient to create the necessary variation of induction for detection are exposed to the action of the target.

The invention will be better understood with the aid of the ensuing description of the preferred embodiment of the detector of the invention, referring to the accompanying drawing.

DETAILED DESCRIPTION OF THE PREFERRED EMBODIMENT

Figure 1:
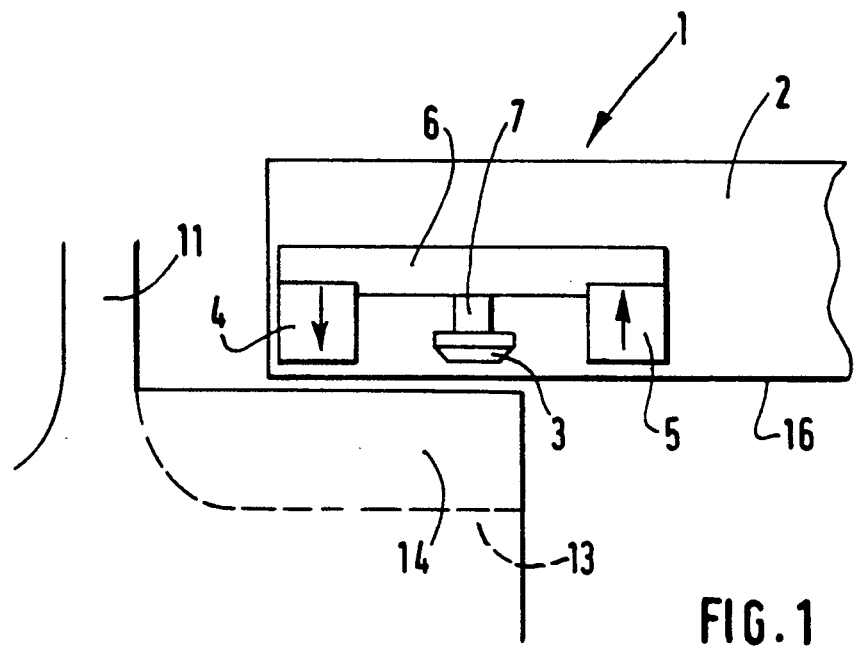
FIG. 1 is a schematic view of the detector of the invention.
Figure 3:
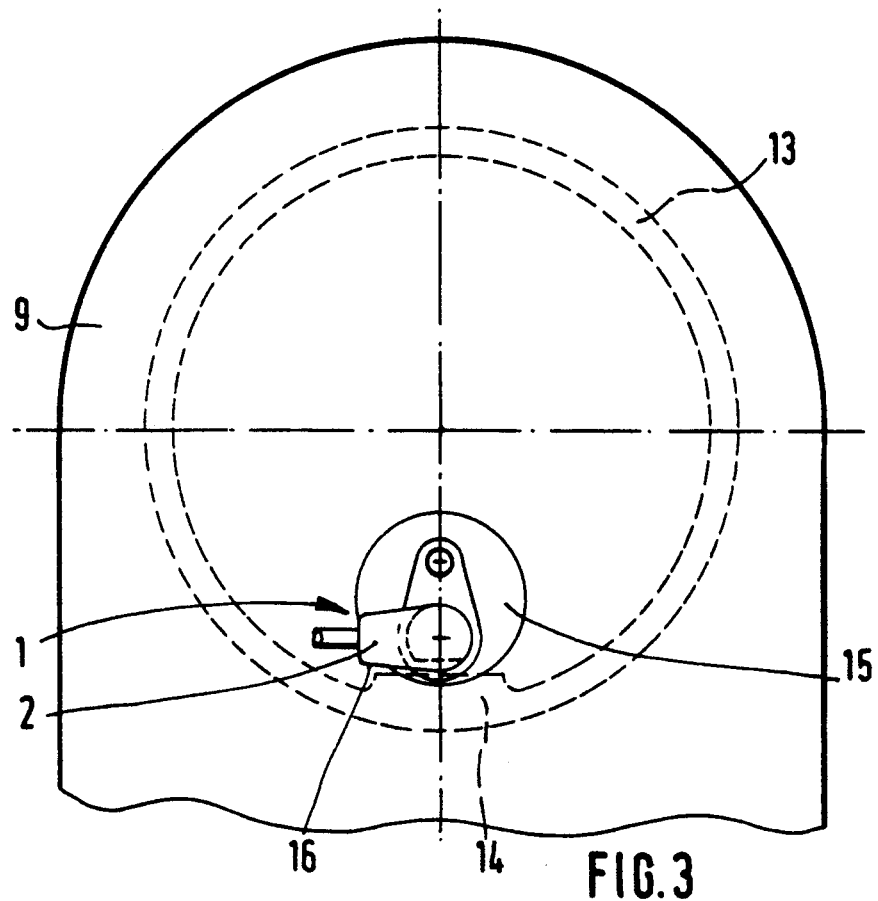
FIG. 3 is an end view of the part of the engine shown in FIG. 2.
Figure 2:
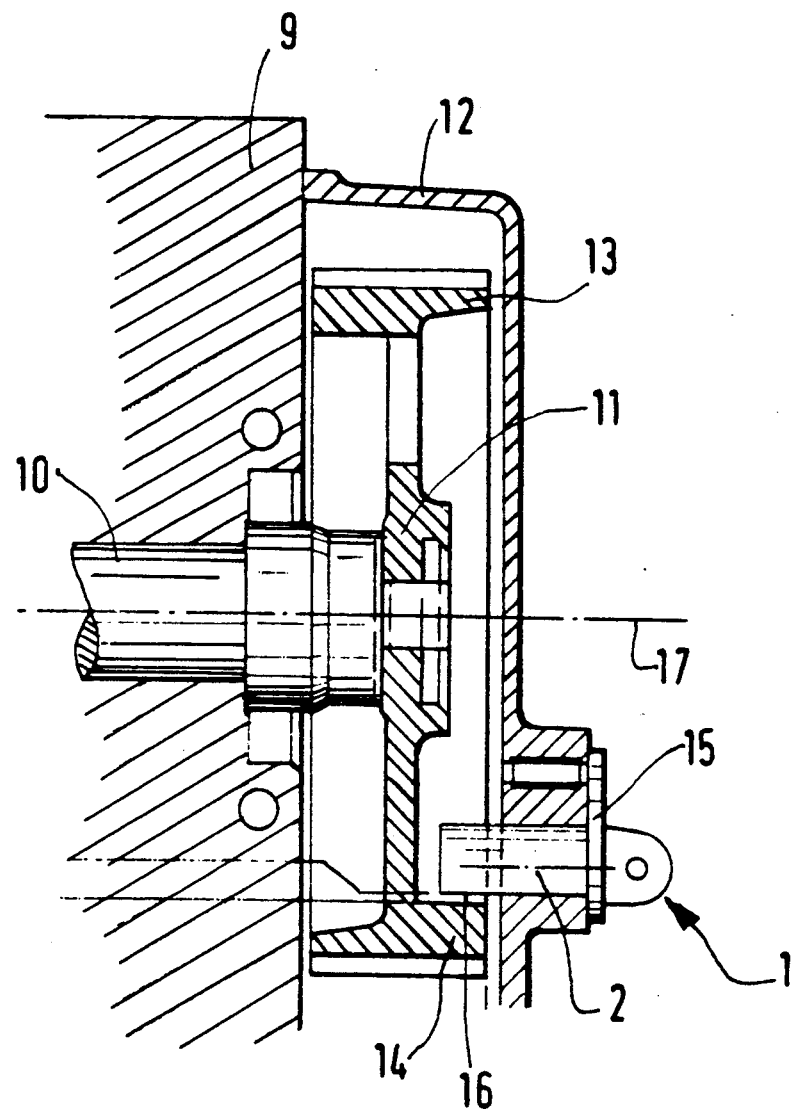
FIG. 2 is a fragmentary view in longitudinal section of part of the engine in which the detector is installed.

The first cylinder detector 1 is installed on a printed wiring board 2, on one side of which, not visible in FIG. 1, components for processing the detection signal are installed in the conventional manner, and whose other side carries a unipolar Hall effect pickup 3 and two permanent magnets 4, 5, all three of these elements being fixed on an armature 6, the pickup 3 being fixed to a cross-wise extension 7 of the armature. The pickup 3 between the magnets 4, 5 is fixed here by gluing, and the armature 6 is similarly glued to the board 2. The two magnets 4, 5 are disposed symmetrically with respect to the sensitive zone of the pickup 3, near an active edge 16 of the board, and the magnet 4 is substantially at one end of the board, and they produce two magnetic fields of the same amplitude, but with lines of flux aimed in opposite directions indicated by arrows, which lines of flux are substantially parallel to the board 2 and perpendicular to the general plane of the armature 6 and to the active edge 16 of the board.

The detector 1 is installed to sequence the injection of gasoline into the cylinders of an internal combustion engine 9, which in particular includes a camshaft 10. A pulley 11 of soft magnetic material is wedged to the end of the shaft 10 and protected by a cover 12. The pulley 11 includes an external rim 13, which is turned toward the outside of the engine. An angular portion 14, which has a radial thickness that is notably greater than the rest of the rim 13 of lesser thickness, is called a target. The pulley 11 thus rotates with the camshaft 10 and is rotationally movable with and in phase with the piston of the first cylinder of the engine 9.

The board 2 of the detector 1 is mounted on a flange 15 which is affixed to the outside of the cover 12, so that the board extends through the cover 12, projecting to the interior over a distance or overlap substantially equal to the spacing between the opposed edges of the pickup 3 and the magnet 4 fixed to the end of the board. The active edge 16 of the board 2 is at a distance from the axis 17 of the shaft 10 that is only slightly less than the inside radius of the thickened portion 14 of the rim 13 of the pulley 11, so as to make a small air gap here at the time of the passage of this portion 14 past the detector 1.

When the thickened portion, or target, 14 of the rim 13 of the pulley 11 is facing the detector 1, the piston of the first cylinder of the engine 9 is at top dead center.

The detector 1 is installed so as to detect the passage of the target 14.

When the thin portion of the rim 13 of the pulley 11 faces the detector 1, which has been identified before as the resting state and is shown in dashed lines in FIG. 1, the magnet fields of the two magnets 4, 5 cancel one another out in the sensitive zone of the pickup 3, and this sensitive zone is exposed to a resultant zero or virtually zero magnetic field. When the target 14 moves past the magnet 4 and the pickup 3, it loops more field lines from the magnet 4 than from the magnet 5 to the pickup 3, because the lines of flux of the magnet 4 are preponderant. The result is a variation in flux detected by the Hall effect pickup 3 which generates a square output signal indicative of the first cylinder piston being at top dead center.

What is claimed is:

1. A first cylinder detector for an internal combustion engine arranged relative to the rim of a rotating pulley comprising:
    a target of soft magnetic material formed on the rim of the pulley,
    a unipolor Hall effect pickup defining a sensitive zone,
    a first and a second permanent magnet arranged symmetrically with respect to the pickup so that the magnetic field in the sensitive zone is substantially zero when the target is not in the sensitive zone and said pickup generates no output signal, but when the target is in the sensitive zone, the target provides a loop for the lines of flux of said first magnet to the sensitive zone causing the pickup to generate a square wave output signal.

2. The first cylinder detector of claim 1 wherein said first and said second magnet produce fields of the same amplitude but opposite polarities with respect to the sensitive zone of the pickup.

3. The first cylinder detector of claim 1 wherein the target is constituted by a thickened portion of the pulley rim, the pulley being solidly joined to the camshaft of the engine.

4. The first cylinder detector of claim 1 wherein the target is positioned to be within the sensitive zone when the first cylinder piston is at the top dead center position.

5. A detector for generating an output signal indicative of the first cylinder piston of an internal combustion engine being at top dead center position comprising:
    a pulley rotatable by the engine, said pulley having a rim and a target constituted by a thickened portion of the pulley rim,
    a Hall effect pickup defining a sensitive zone,
    a first and a second permanent magnet arranged symmetrically with respect to the pickup, each magnet producing fields of the same magnitude but of opposite direction with regard to the pickup so that the field in the sensitive zone of the pickup is substantially zero in the absence of the target, and
    means for causing the target to move past one only of said first and second magnet so that the pickup is exposed essentially to said one only magnet field, to thereby produce a square wave output signal.

6. The detector of claim 5 wherein said means for causing the target to move includes a camshaft rotated by the engine.

* * * * *